United States Patent [19]
Fulks et al.

[11] Patent Number: 5,620,172
[45] Date of Patent: Apr. 15, 1997

[54] HYDRAULIC DAMPER

[75] Inventors: Gary C. Fulks, Spring Valley, Ohio; Nicholas Jones, La Morlaye, France; Manuel T. Barbosa, Cadiz, Spain; Francisco J. S. Jimenez, Cadiz, Spain; Antonio Perez De La Lastra Arjona, Cadiz, Spain; Miguel C. Garcia, Cadiz, Spain; Jose I. M. Gorostidi, Cadiz, Spain

[73] Assignee: Delphi France Automotive Systems, Gennevilliers, France

[21] Appl. No.: 380,549

[22] Filed: Jan. 30, 1995

[30] Foreign Application Priority Data

Nov. 9, 1993 [GB] United Kingdom .................. 9323047

[51] Int. Cl.$^6$ .................................................. B60G 13/00
[52] U.S. Cl. .......................... 267/221; 267/179; 280/668; 280/724
[58] Field of Search ............................. 267/34, 286, 221, 267/222, 174–179; 188/322.11, 322.19; 280/701, 668, 696, 670, 724

[56] References Cited

U.S. PATENT DOCUMENTS

| | | |
|---|---|---|
| 2,999,678 | 9/1961 | Heckethorn .............................. 267/221 |
| 4,212,087 | 7/1980 | Mortensen ............................ 188/313 X |
| 4,214,737 | 7/1980 | Blatt ..................................... 267/137 X |
| 4,480,730 | 11/1984 | Koller et al. ............................. 188/315 |
| 4,667,941 | 5/1987 | Hayashi et al. ...................... 267/64.16 |
| 4,913,268 | 4/1990 | Parker et al. ....................... 188/322.19 |
| 4,962,834 | 10/1990 | Miner .................................. 188/322.11 |
| 5,326,084 | 7/1994 | Mevissen et al. .................... 267/34 X |
| 5,450,908 | 9/1995 | Hagman et al. ...................... 267/34 X |

FOREIGN PATENT DOCUMENTS

| | | |
|---|---|---|
| 8510058 | 4/1985 | Germany . |
| 4129644A1 | 11/1993 | Germany . |
| 4129645A1 | 11/1993 | Germany . |
| 2-253026 | 10/1990 | Japan ..................................... 267/221 |
| 2050557 | 1/1981 | United Kingdom ................... 267/221 |

*Primary Examiner*—Lee W. Young
*Attorney, Agent, or Firm*—Jeffrey A. Sedlar

[57] ABSTRACT

A hydraulic damper for a motor vehicle comprising a longitudinally extending tube and a separately formed spring seat positioned on the tube, wherein the tube is formed from extruded aluminium or aluminium alloy, and the spring seat is formed from aluminium or aluminium alloy.

2 Claims, 9 Drawing Sheets

HYDRAULIC DAMPER

BACKGROUND OF THE INVENTION

This invention relates to a hydraulic damper for a motor vehicle, and to a method of forming such a hydraulic damper. By hydraulic damper is meant a suspension strut or shock absorber.

Attention is drawn to related U.S. patent applications Ser. Nos. (Attorney Docket Nos. H-179080 entitled "Spin Closing Apparatus and Method", H-179172 entitled "Hydraulic Damper" and H-185553 entitled "Hydraulic Damper"), filed concurrently with the present application.

A hydraulic damper for use in the suspension system of a motor vehicle typically comprises a tube; a piston sealably slidably mounted in the tube and attached to a piston rod, the piston separating a compression chamber from a rebound chamber within the tube; a compression stroke valve mounted on the piston which allows fluid flow from the compression chamber to the rebound chamber; and a rebound stroke valve mounted on the piston which allows fluid flow from the rebound chamber to the compression chamber. The piston rod extends out of the tube at one end thereof, and is sealably slidably mounted in that one end. Such hydraulic dampers either comprise an inner tube and an outer tube (sometimes referred to as a twin tube damper) in which the piston sealably slides in the inner tube, or comprise a single tube (sometimes referred to as a monotube damper).

It is usual practice to form the or each tube of a hydraulic damper by rolling a sheet of steel and welding together the adjacent longitudinal edges. External parts, such as the spring seat and the mounting bracket or steering knuckle, which are also formed from steel, are then welded to the single tube or the outer tube. The other end of the tube is sealed closed by welding on an end plate or by arc-heating and rolling the tube end, and the internal components of the suspension strut (such as those mentioned above) are inserted into the tube by way of the one end thereof, which is then sealed closed. The use of several welding steps has disadvantages in that welds are time consuming operations. Further, welds are susceptible to corrosion. Still further, the use of steel has disadvantages with regard to weight.

SUMMARY OF THE INVENTION

It is an object of the present invention to overcome one or more of the above mentioned disadvantages.

To this end, a hydraulic damper in accordance with the present invention comprises a longitudinally extending tube and a separately formed spring seat positioned on the tube, wherein the tube is formed from extruded aluminium or aluminium alloy, and the spring seat is formed from aluminium or aluminium alloy.

A method of forming a hydraulic damper in accordance with the present invention comprises extruding a tube of aluminium or aluminium alloy; forming a spring seat of aluminium or aluminium alloy; and positioning the spring seat on the extruded tube.

This invention removes the steps of welding, thereby removing time consuming operations. Further the use of aluminium or aluminium alloy has advantages with regard to weight when compared to previously known arrangements.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENTS

Figure 2:
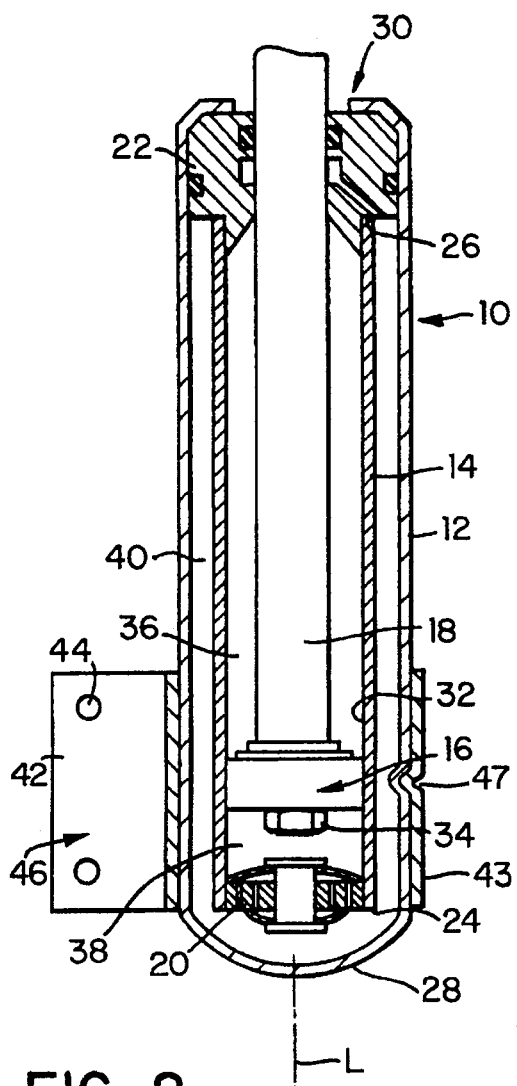
FIG. 2 is a cross-sectional view of the hydraulic damper; of FIG. 1 with the spring seat and its attachment arrangement omitted for clarity.

Referring to the FIG. 2 of the drawings, the hydraulic damper 10 shown is of the twin tube damper type, and comprises an outer tube 12, and an inner tube 14 substantially coaxial with the outer tube on an axis L. The outer tube 12, and preferably the inner tube 14, are formed from extruded aluminium or aluminium alloy and have a substantially constant cross-section along their length. The hydraulic damper 10 further comprises conventional components such as a piston assembly 16, a piston rod 18 having a longitudinal axis on axis L, a compensation valve 20, and a rod guide 22. The piston assembly 16 includes a compression valve and a rebound valve (not shown). The piston assembly 16, the compensation valve 20 and the rod guide 22 may be any suitable conventional design well known to those skilled in the art, and will not be described in detail. The inner tube 14 is substantially closed at one end 24 by the compensation valve 20, and is substantially closed at the other end 26 by the rod guide 22. The outer tube 12 is closed at one end 28 by flame heating and rolling the outer tube walls, and is substantially closed at the other end 30 (the open end) by the rod guide 22 and by spin closing the end 30 of the outer tube as.

An example of apparatus suitable for spin closing is disclosed in our GB Patent Application No. 9412806.3 and corresponding U.S. patent application Ser. No. (Attorney Docket No. H-179080 filed concurrently with the present application) incorporated herein by reference, in which a pair of rollers initially push a portion of the outer tube at the open end over at approximately 45 degrees, and a second pair of rollers then push a section of the portion over at approximately 90 degrees, whilst the outer tube is spinning about its longitudinal axis. A detailed description of the apparatus disclosed in GB Patent Application No. 9412806.3 is reproduced infra. Drawings related to the apparatus description are included as FIGS. 10–14.

The piston rod 18 extends through, and makes a sealing sliding fit with the rod guide 22. The piston assembly 16 makes a sealing sliding fit with the inner surface 32 of the inner tube 14. The piston rod 18 is secured to the piston assembly 16 by a nut 34 or any other suitable means. The piston assembly 16 divides the inner area of the inner tube 14 into a rebound chamber 36 and a compression chamber 38. The area between the inner tube 14 and the outer tube 12 defines a compensation chamber 40. The rebound and compression chambers 36 and 38 are substantially filled with fluid to damp reciprocating movement of the piston assembly 16 and piston rod 18 along axis L relative to the outer and inner tubes 12 and 14. The compensation chamber 40 is partly filled with fluid and acts as a reservoir for the fluid in the rebound and compression chambers 36 and 38.

The hydraulic damper 10 is mounted in a motor vehicle (not shown) using mounting means in the form of a mounting bracket 46. The mounting bracket 46 is extruded from aluminium or aluminium alloy to integrally form a tubular portion 43 with a pair of spaced arms 42 which are substantially parallel. The tubular portion 43 has an internal diameter which is sized to make a close sliding fit on the outer tube 12. Pairs of holes 44 are cut in each arm 42 to form mounting apertures for the mounting bracket 46. The mounting bracket 46 is then slid into position on the outer tube 12, and is secured in place by pressing or punching a tangentially extending groove 47 in the tubular portion 43 and the outer tube 12. Other forms of mounting means may be used as an alternative to the bracket 46, or other attachment arrangements may be used besides the groove 47. As an alternative to flame heating and rolling closed the one end 28 of the outer tube 12, the one end may be sealed and closed by a separately formed end plate or by flattening the one end of the outer tube into a substantially planar formation, and then rolling the planar formation in the longitudinal direction. As a further alternative, however, a mounting means of aluminium or aluminium alloy may be cast with an integral end cap and secured to the one end of the extruded tube to seal and close the one end.

Figure 1:
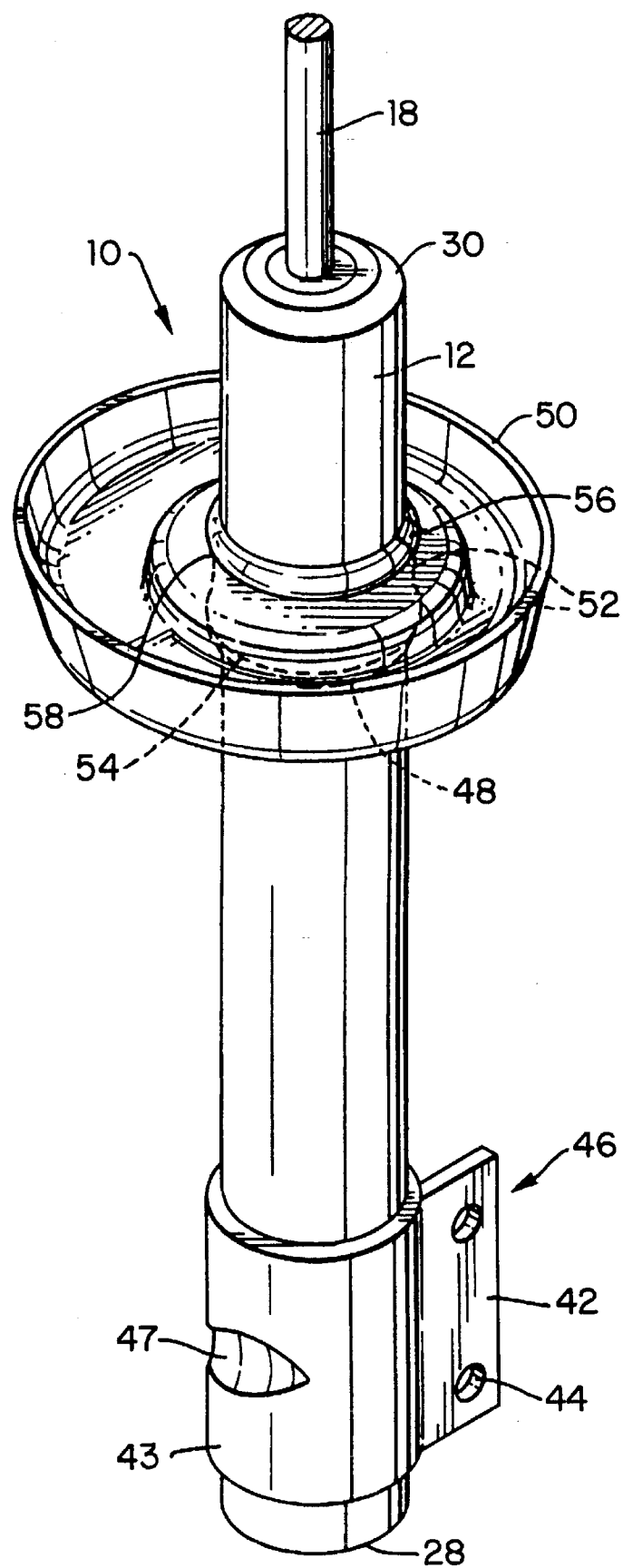
FIG. 1 is a perspective view of a hydraulic damper in accordance with the present.

A spring seat 50 is attached to the outer tube 12 as shown in FIG. 1. A first external, circumferentially extending, bead 48 is formed in the outer tube 12, preferably as described below. The spring seat 50, which is of aluminium or aluminium alloy, is formed by pressing or casting and includes a cylindrical section 52 which has an internal shape and size which is substantially the same as the external shape and size of the outer tube 12—that is, the cylindrical section can make a close sliding fit on the outer tube. The spring seat 50 is slid onto the outer tube 12, with the tube passing through the cylindrical section 52. One end 54 of the cylindrical section rests on the first bead 48. A second external, circumferentially extending, bead 56 is then formed in the outer tube 12 adjacent the other end 58 of the cylindrical section 52 to secure the spring seat 50 on the outer tube. The second bead 56 is optional and may be omitted because, in use, a coil spring (not shown) acts on the spring seat 50 to bias the one end 54 of the cylindrical section 52 into contact with the bead 48.

Figure 4:
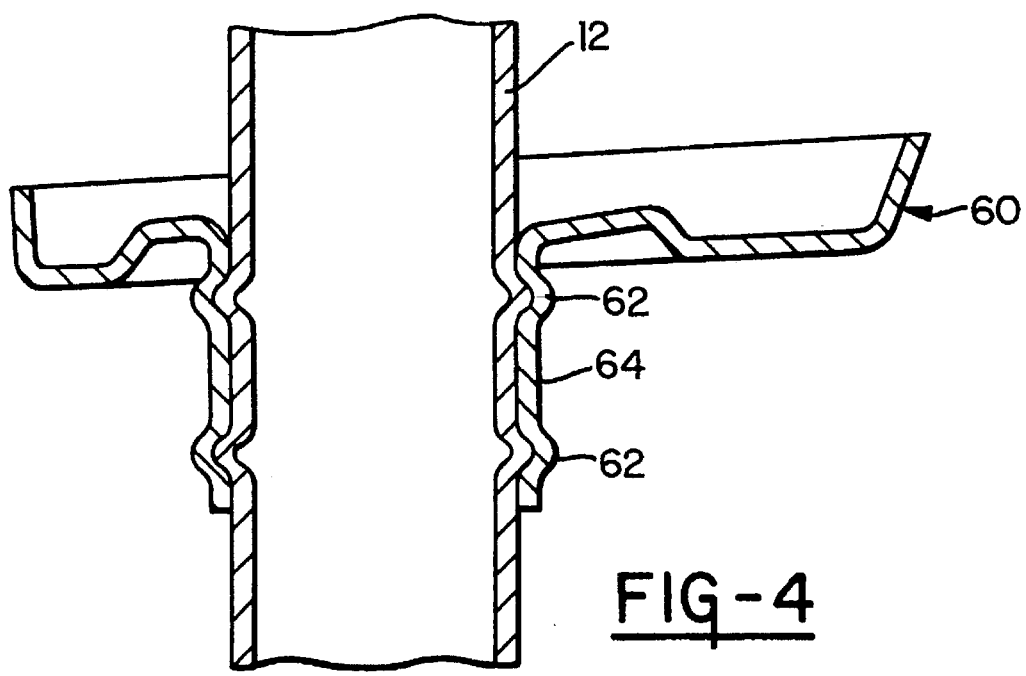
FIG. 4 is a cross-sectional view similar to that of FIG. 3 showing an alternative arrangement for securing the spring seat.

In the modified arrangement shown in FIG. 4, the spring seat 60 is slid into position before the formation of any bead or beads. One or more external, circumferentially extending, beads 62 are them formed simultaneously in the outer tube 12 and in the cylindrical section 64 of the spring seat 60 to secure the spring seat 60 in position. Preferably, two beads 62 are formed.

Figure 5:
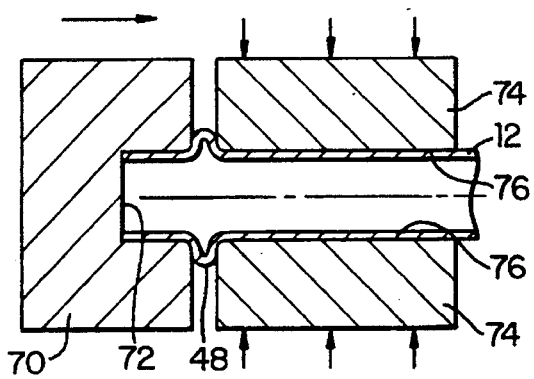
FIG. 5 is a cross-sectional view of apparatus for forming the beads shown in FIGS. 3 and 4.
Figure 3:
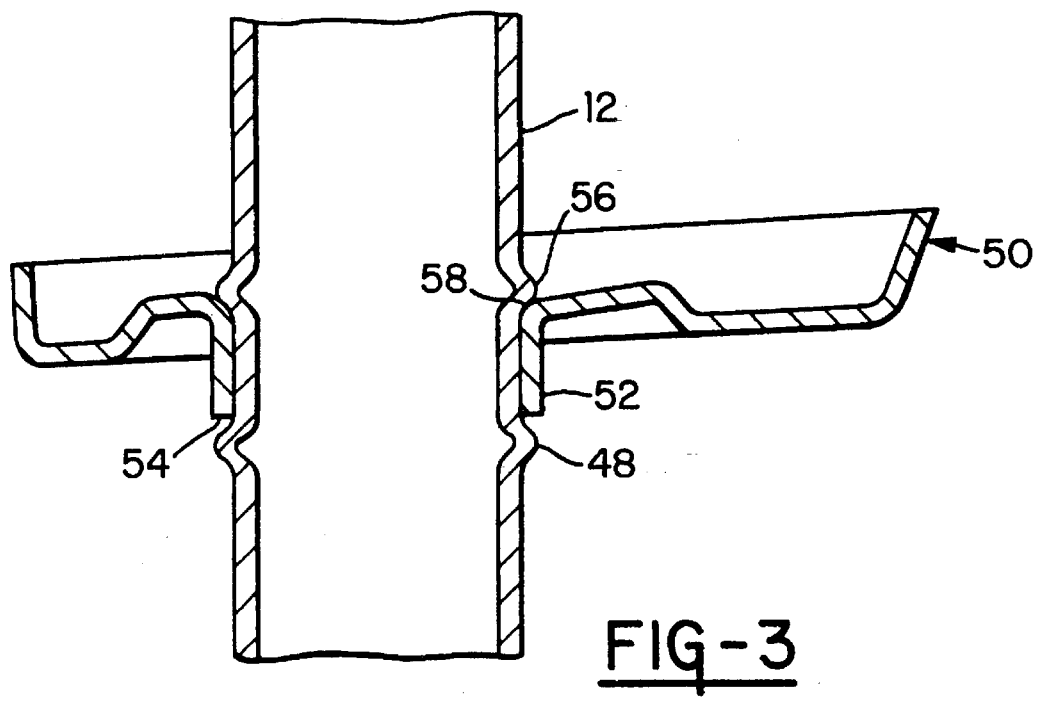
FIG. 3 is a cross-sectional view of the spring seat and extruded tube of the hydraulic damper of FIG. 1.

The external circumferentially extending bead 48 of FIG. 3 is preferably formed as shown in FIG. 5 by positioning one end of the extruded tube 12 in a die 70 having a correspondingly shaped closed bore 72, and by positioning a pair of substantially identical dies 74 having substantially semi-circular grooves 76 therein around the extruded tube but slightly spaced from the die 70. The dies 74 are then moved towards one another to grip the extruded tube 12 and the die 70 moved towards the dies 74 to form the bead 48, the relative movement between the dies being indicated by the arrows in FIG. 5. Similar arrangements can be used for forming the beads 56 and 62 of FIGS. 3 and 4 respectively. In a preferred arrangement, the spring seat 50 of FIG. 3 is slid into position on the outer tube 12 before the formation of the bead 48. The bead 48 is then formed as described above. This arrangement reduces the risk of the outer tube 12 expanding adjacent the bead 48 (because of the presence of the cylindrical section 52 of the spring seat 50) and causing problems with any subsequent attempt to slide the spring seat into position.

As an alternative to this arrangement, the spring seat 50 may be secured by forming two rings of external dimples rather than beads, or by rivets, or any other suitable alternative arrangement. Either prior to, or after, attachment of the spring seat 50, the one end 28 of the outer tube 12 is closed by flame heating the end of the outer tube, and then rolling over the end. Having formed the outer tube 12 with the mounting bracket 46 and the spring seat 50 secured thereto, and having closed the one end 28, the other components (as described above) of the hydraulic damper 10 can then be assembled therein.

Figure 6:
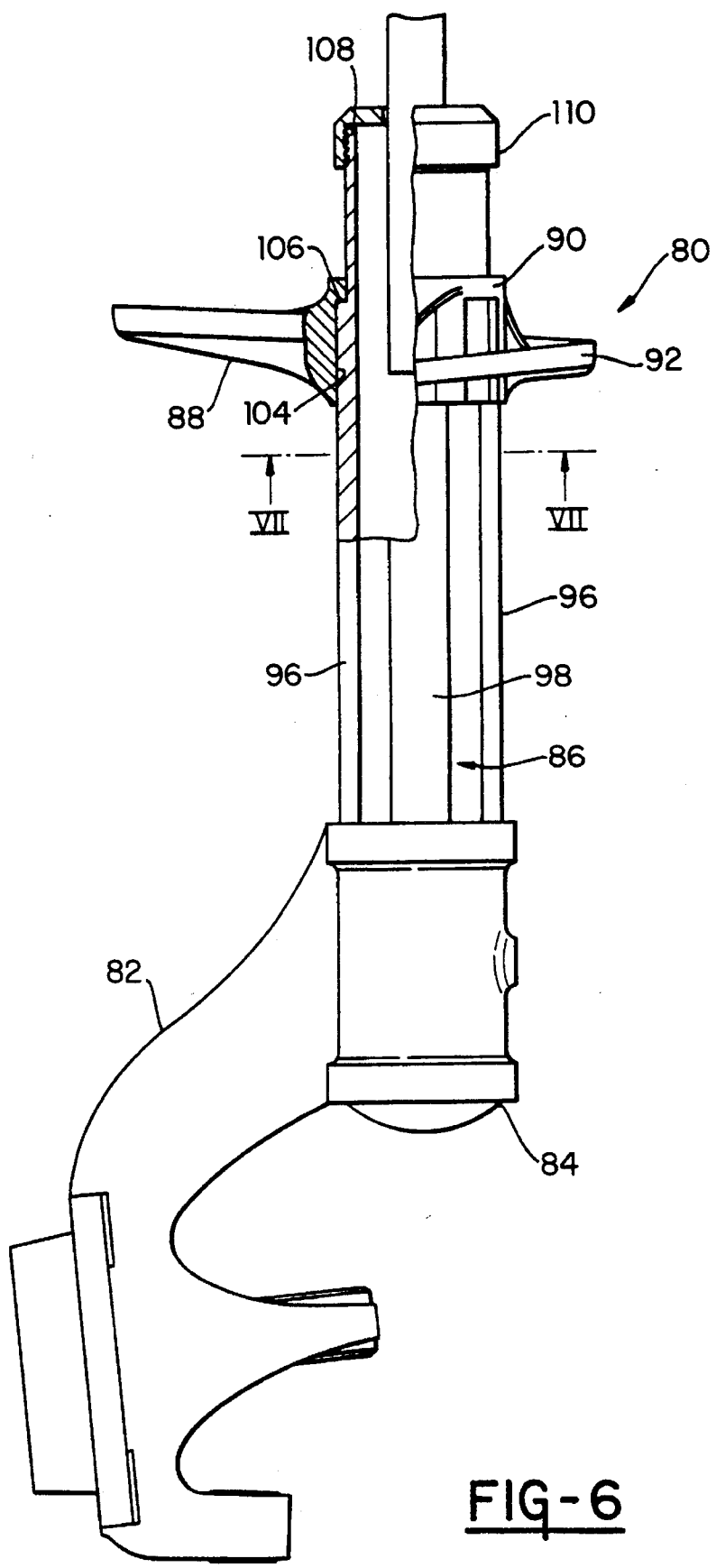
FIG. 6 is a partial cross-sectional view of an alternative embodiment of hydraulic damper in accordance with the present invention.
Figure 8:
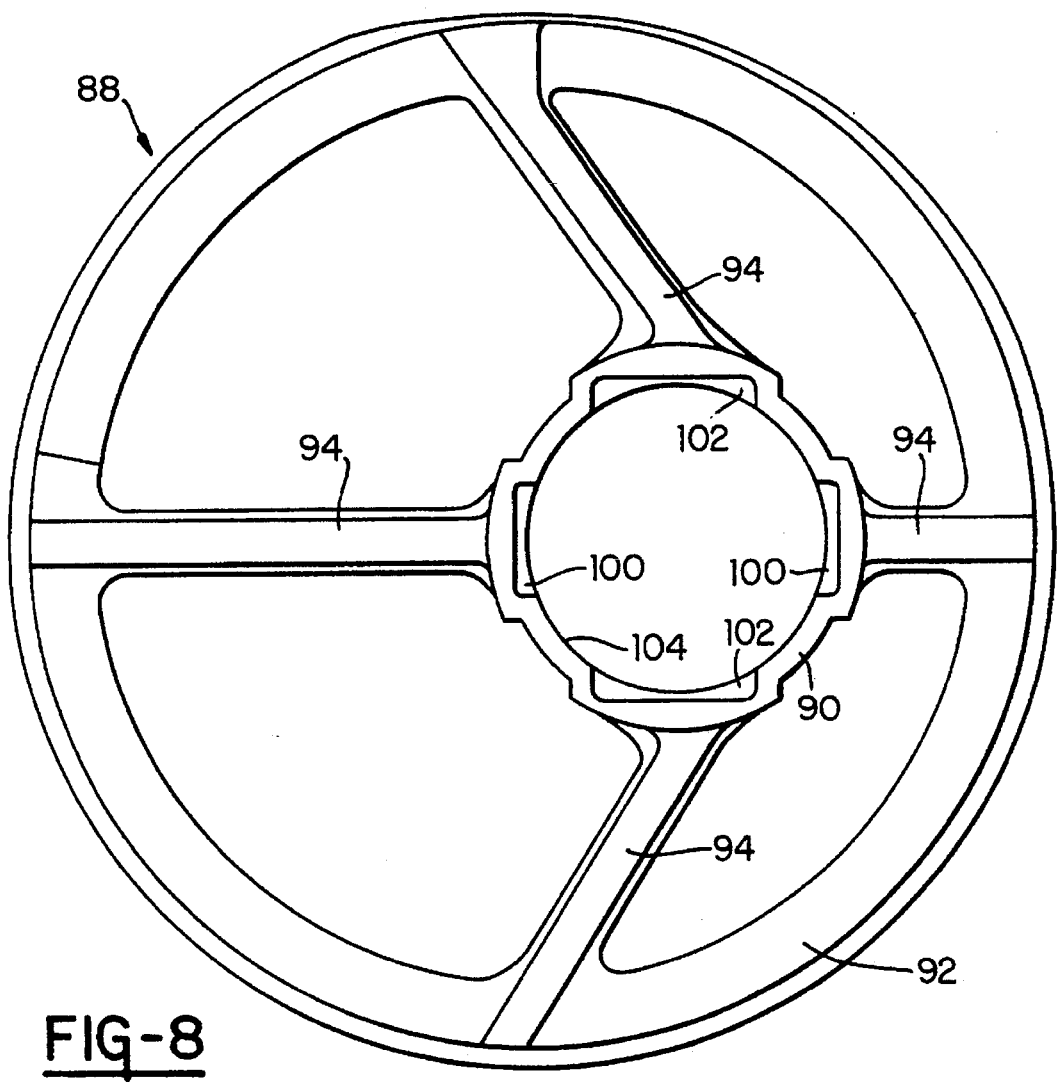
FIG. 8 is an end view of the spring seat of the hydraulic damper of FIG. 6.
Figure 9:
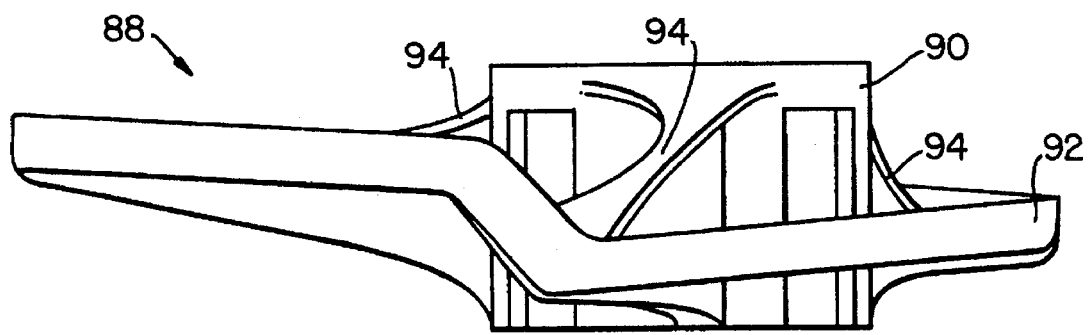
FIG. 9 is a side view of the spring seat of FIG. 8.

In the alternative embodiment of hydraulic damper 80 shown in FIG. 6, mounting means in the form of a steering knuckle 82, which is cast from aluminium or aluminium alloy, is secured to one end 84 of an extruded aluminium or aluminium alloy tube 86. Other forms of mounting means may be used. A spring seat 88 which is also cast from aluminium or aluminium alloy is positioned on the extruded tube 86. As shown in FIGS. 8 and 9, the spring seat 88 has a shape which is similar to a spoked wheel and comprises an inner cylindrical section 90, an outer annular portion 92, and a number of spokes 94 interconnecting the cylindrical section and the annular portion. The spokes 94 have a predetermined shape and size to provide the necessary strength for the spring seat 88. The annular portion 92 provides a seat for a coil spring (not shown) on installation of the hydraulic damper 80 on a motor vehicle. The use of spokes 94 helps to reduce the weight of the spring seat 88 and the accumulation of dirt on the spring seat.

Figure 7:
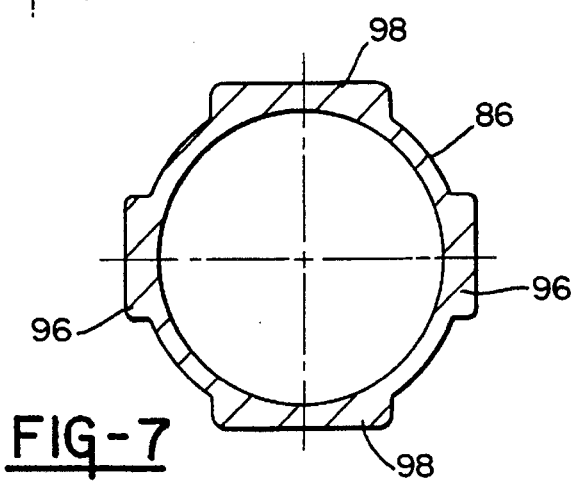
FIG. 7 is a cross-sectional view of the extruded tube of the hydraulic damper of FIG. 6 taken on the line VII—VII.

As can be seen from FIG. 7, the extruded tube 86 is formed with two pairs of external, longitudinally (axially) extending, outwardly directed, ribs 96,98, with the ribs of each pair being diametrically opposed, and the pairs being set at right angles to one another. The ribs 96,98 of each pair have substantially the same cross-sectional shape and area, but different from the cross-sectional shape and area of the other pair of ribs. The cylindrical section 90 of the spring seat 88 has correspondingly shaped and sized grooves 100,102 formed in its internal surface 104. This arrangement allows the spring seat 88 to make a close sliding fit with the extruded tube 86, and also provide means for correctly locating the spring seat relative to the extruded tube. A part of one or more of the ribs 96,98 is removed after extrusion of the tube 86 and a part of the corresponding groove or grooves 100,102 is omitted on casting to provide one or more pairs of engaging shoulders 106 which act as a stop to again correctly locate the spring seat 88 on the extruded tube 86.

As an alternative to the above described arrangement, the extruded tube may be extruded with grooves therein and the cylindrical section of the spring seat cast with corresponding inwardly directed ribs.

Referring back to FIG. 6, the other end 108 of the extruded tube 86 is closed by a threaded cap 110, as an alternative arrangement to spin closing, which is screw threaded onto threads formed on the extruded tube 86.

In a modification of the arrangement shown in FIGS. 6 to 9, the ribs and grooves are omitted, and the spring seat is cast with an integral cylindrical section and threaded cap. The end of the extruded tube is threaded as shown in FIG. 6, and screw threading of the cap to the extruded tube positions the spring seat on the extruded tube.

Whilst the above described embodiments refer to the twin tube type of hydraulic damper, it will be appreciated that at least some of these arrangements are also applicable to hydraulic dampers of the monotube type in which the sole tube of the damper is formed from extruded aluminium or aluminium alloy and has an aluminium or aluminium alloy spring seat positioned thereon.

Preferably the extruded tube and the spring seat are formed from aluminium alloy conforming to BS 6082 and which comprises, by weight percentage, 0.70 to 1.3% Si, 0.5% Fe, 0.1% Cu, 0.4 to 1.0% Mn, 0.6 to 1.2% Mg, 0.25% Cr, 0.2% Zn, 0.1% Ti, 0.05 to 0.15% impurities, with the remainder being aluminium. Other compositions of aluminium alloy may be used.

All of the above described arrangements have advantages in terms of easier manufacture and assembly, and of providing a hydraulic damper of reduced weight compared to previously known arrangements.

Following is a detailed description of spin closing apparatus according to GB Patent Application No. 9412806.3 and corresponding U.S. patent application Ser. No. (Attorney Docket No. H-179080). FIGS. 10–14 and the following description related thereto are included to supplement the disclosure, which as filed in the corresponding foreign case, incorporates this material by reference. The corresponding foreign case will be filed as a continuing application of GB Patent Application No. 9323047.2.

Figure 10:
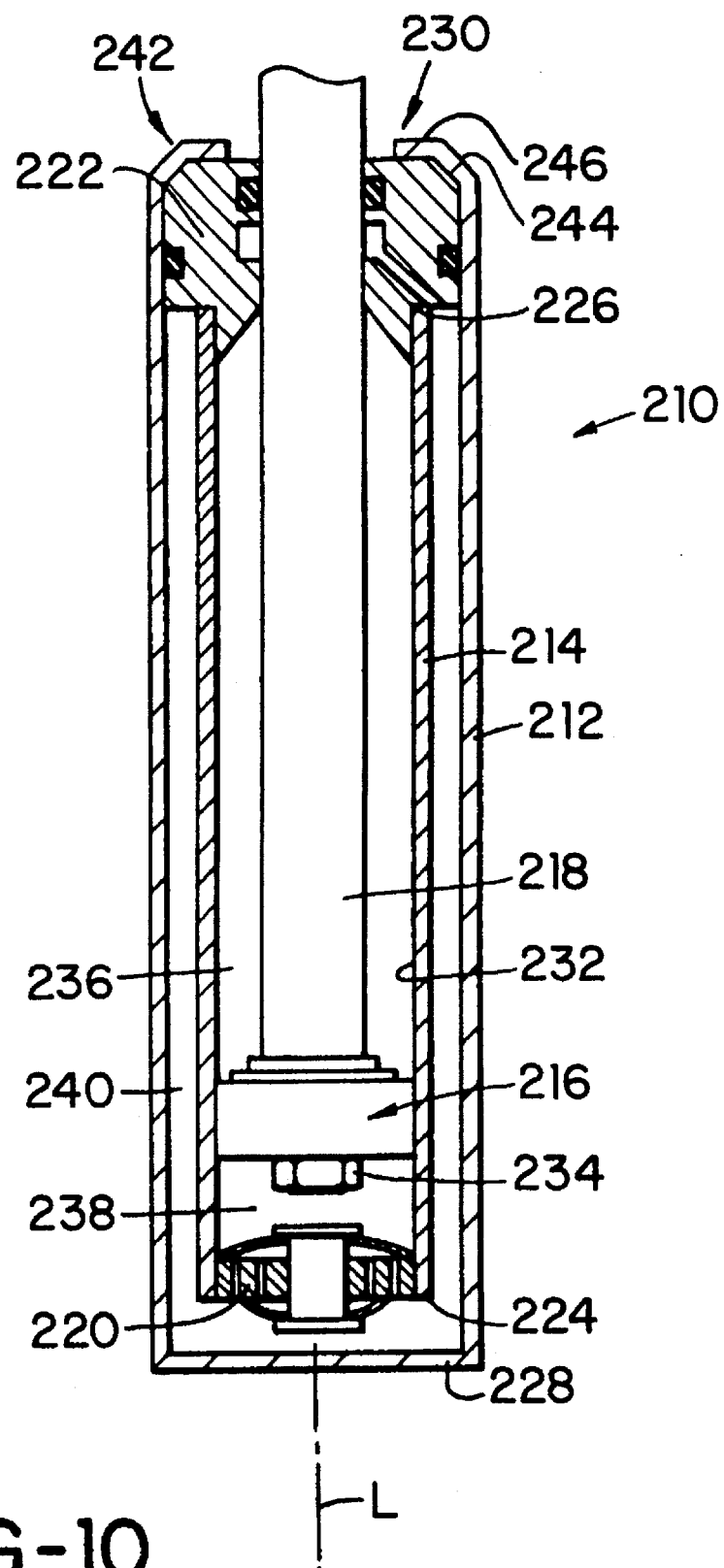
FIG. 10 is a cross-sectional view of a suspension strut.

Referring to the drawings, the suspension strut 210 shown in FIG. 10 is of the twin tube damper type, and comprises an outer tube 212, an inner tube 214 substantially coaxial with the outer tube on an axis L, a piston assembly 216, a piston rod 218 having a longitudinal axis on axis L, a compensation valve 220, and a rod guide 222. The piston assembly 216, the compensation valve 220 and the rod guide 222 may be any suitable conventional design well known to those skilled in the art, and will not be described in detail. The inner tube 214 is substantially closed at one end 224 by the compensation valve 220, and is substantially closed at the other end 226 by the rod guide 222. The outer tube 212 is closed at one end 228 by an integral formation of the outer tube walls, and is substantially closed at the other end 230 (the open end) by the rod guide 222 and by spin closing the end 230 of the tube as will be described in more detail below. The piston rod 218 extends through, and makes a sealing sliding fit with the rod guide 222. The piston assembly 216 makes a sealing sliding fit with the inner surface 232 of the inner tube 214. The piston rod 218 is secured to the piston assembly 216 by a nut 234 or any other suitable means. The piston assembly 216 divides the inner area of the inner tube 214 into a rebound chamber 236 and a compression chamber 238. The area between the inner tube 214 and the outer tube 212 defines a compensation chamber 240. The rebound and compression chambers 236 and 238 are substantially filled with fluid to damp reciprocating movement of the piston assembly 216 and piston rod 218 along axis L relative to the outer and inner tubes 212 and 214. The compensating chamber 240 is partly filled with fluid and acts as a reservoir for the fluid in the rebound and compression chambers 236 and 238. The suspension strut 210 is mounted in a motor vehicle (not shown) in the standard manner.

Figure 11:
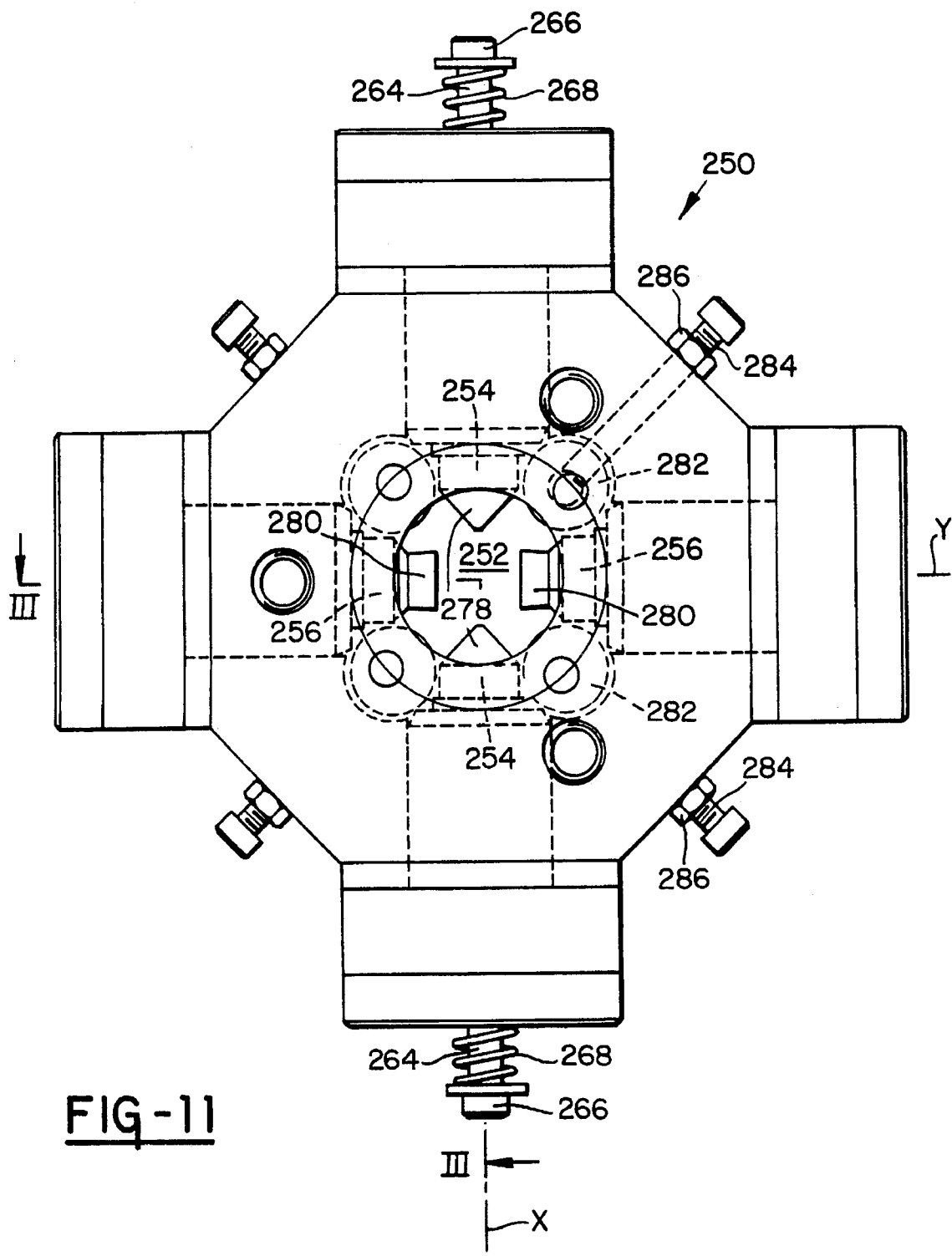
FIG. 11 is a top view of a spin closing apparatus.
Figure 12:
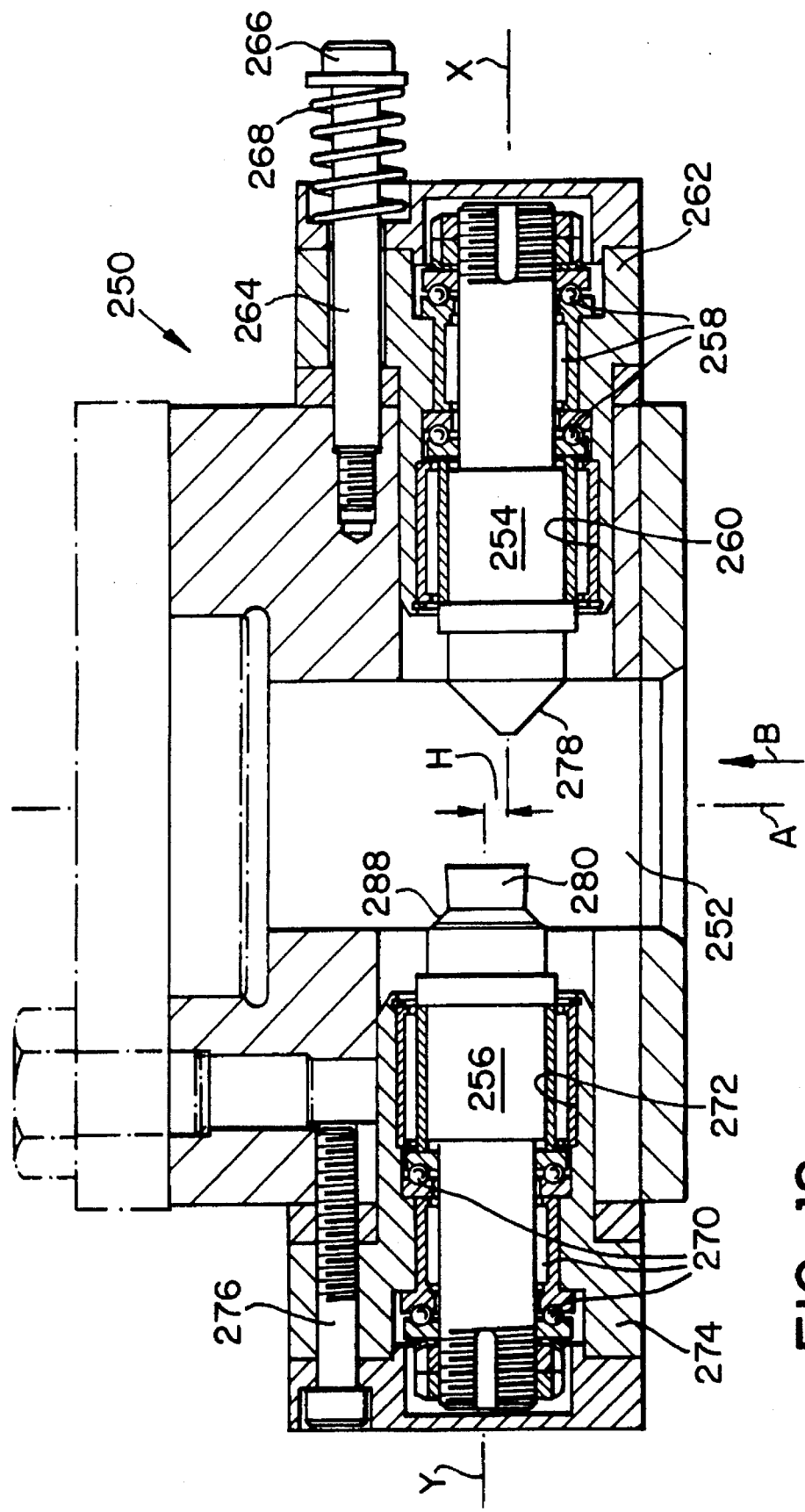
FIG. 12 is a cross-sectional view on the line III—III of FIG. 11.

The end 230 of the outer tube 212 comprises a section 242 of the outer tube which is directed inwardly towards the axis L. The section 242 comprises a first portions 244 which is directed inwardly at an angle of approximately 45° to the axis L, and a second portion 246 at the extremity of the outer tube 212 which is directed inwardly at an angle of approximately 90° to the axis L. Prior to spin closing the section 242, the suspension strut 210 is assembled by closing the end 228 of the outer tube 212, inserting the inner tube 214 with the compensation valve 224 in position, the piston assembly 216 and piston rod 218, and the rod guide 222. The section 242 is then formed using apparatus 250 as shown in FIGS. 11 and 12.

The apparatus 250 comprises a throughbore 252 which has a longitudinal axis A which aligns with the axis L of the suspension strut 210 during formation of the section 242. Projecting into the throughbore 252 are two pairs of rollers 254,256. The rollers 254 of the first pair of rollers are positioned substantially diametrically opposed one another relative to the throughbore 252 with aligned longitudinal axes X. The rollers 256 of the second pair of rollers are positioned substantially diametrically opposed one another relative to the throughbore 252 with aligned longitudinal axes Y which are at substantially 90° to the axes X. Both sets of axes X,Y are at substantially 90° to the axis A. As can be seen from FIG. 12, the axes X of the first pair of rollers 254 are offset from the axes Y of the second pair of rollers 256 by an amount H along axis A.

Each roller 254 of the first pair of rollers, which rotates about its axis X, is rotatably mounted on bearings 258 positioned in a bore 260 which opens into the throughbore 252. The bore 260 is defined by a housing 262. The housing 262 is retained in position by way of a stud 264 having a head 266. A helical spring 268 positioned between the head 266 and the housing 262 biases the housing, and hence the roller 254, towards the throughbore 252. With this arrangement, each roller 254 can reciprocate along its axis X relative to the throughbore 252. Each roller 256 of the second pair of rollers, which rotates about its axis Y, is rotatably mounted on bearings 270 positioned in a bore 272 which opens into the throughbore 252. The bore 272 is defined by a housing 274. The housing 274 is fixed in position by way of a stud 276. With this arrangement, the rollers 256 are fixed relative to throughbore 252.

Each roller 254 of the first pair of rollers has a contact surface 278 which is at substantially 45° to the axes X and A. Each roller 256 of the second pair of rollers has a contact surface 280 which is substantially parallel to its axis Y and at substantially 90° to the axis A.

Additional rollers 282 are positioned around, and project into, the throughbore 252. These rollers 282 act on an inserted suspension strut 210 (as explained below) to centralise the suspension strut in the throughbore 252. The position of each roller 282 relative to the throughbore 252 is adjusted and then secured by a threaded stud 284 and nut 286.

Figure 13:
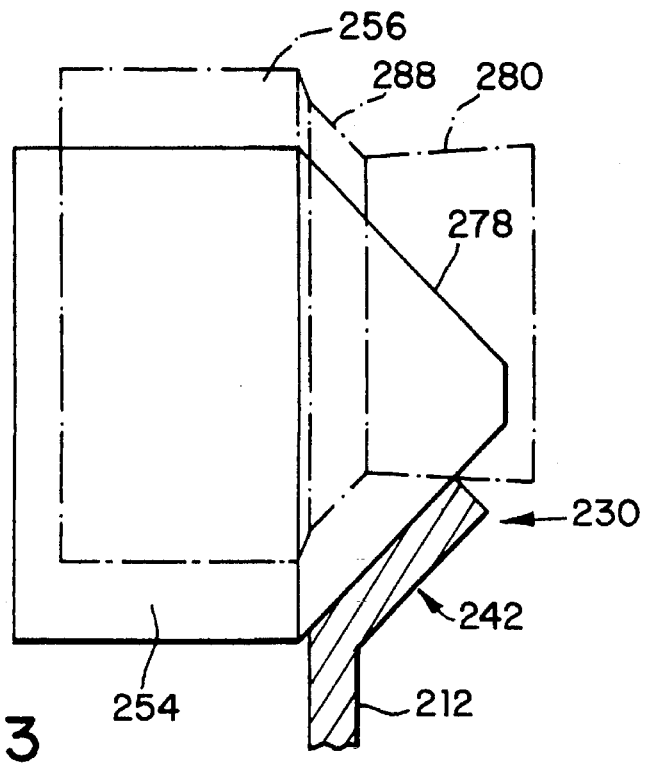
FIGS. 13 and 14 are enlarged side views of the rollers of the apparatus of FIGS. 11 and 12 relative to the tube of the suspension strut during the spin closing operation.
Figure 14:
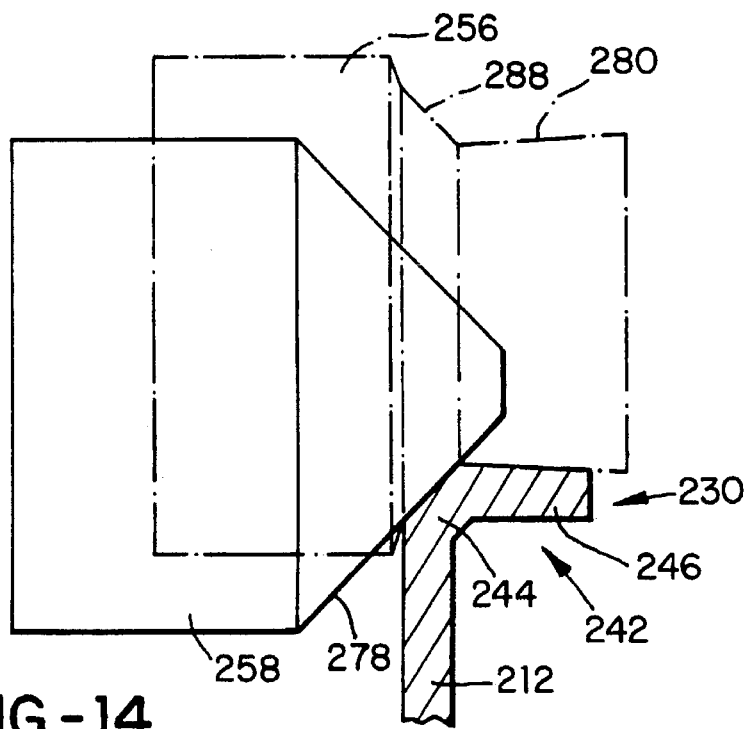

The apparatus 250 is used to spin close the end 230 of the suspension strut 210 as follows. The end 230 of the suspension strut 210, after insertion of the various internal components, is inserted into the throughbore 252 in the direction B relative to the apparatus 250 and spun about its axis L. Any suitable arrangement for spinning the suspension strut 210 which is known to those skilled in the art can be used and will not be described in detail. Initially, the end 230 makes contact with the surfaces 278 of the rollers 254. As the suspension strut 210 continues to move in the direction B, the section 242 of the outer tube 212 is bent over at an angle of approximately 45° by the contact surface 278 as shown in FIG. 13. Further movement of the suspension strut 210 in the direction B brings the free end of the section 242 into contact with the surface 280 of the rollers 256. Still further movement of the suspension strut 210 in the direction B results in the section 242 of the outer tube 212 pushing the rollers 254 back into their bore 260 against the bias of spring 268, and the contact surface 280 on the rollers 256 forming the second portion 246 of the section 242 as shown in FIG. 14. The suspension strut 210 is then removed from the throughbore 252 in the opposite direction to B.

In practice, the contact surface 280 on the rollers 256 is at an angle slightly greater than 90° to allow for the resilience of the second portion 246 of the section 242, which will tend to spring back outwards slightly after spin closing. The contact surface 280 preferably has an extension 288 at the opposite end to its free end which is at an angle of approximately 45° to the axis A which contacts, and retains the integrity of, the first portion 244 of the section 242.

The strength of the spring 268 is predetermined to prevent the rollers 254 retracting too early. The dimension H is predetermined to provide the required dimensions for the first and second portions 244, 246 of the section 242.

Although the above embodiment discloses angles of 45° and 90° for the contact surfaces 278, 280 respectively, it will be appreciated that other angles could be used dependent on the required arrangement of the suspension strut. The only requirement is that the angle of the contact surface on rollers 254 must be smaller than the angle of the contact surface on rollers 256 relative to the axis A.

What is claimed is:

1. A hydraulic damper for a motor vehicle comprising a longitudinally extending tube, a piston assembly slidingly fit within the longitudinally extending tube for reciprocating movement therein and a separately formed spring seat positioned on the tube, wherein the longitudinally extending tube is substantially filled with a fluid that damps the reciprocating movement of the piston assembly within the longitudinally extending tube, wherein the tube is formed extruded aluminum or aluminum alloy, and the spring seat is formed from aluminum or aluminum alloy and wherein the spring seat is held on the longitudinally extending tube solely by engagement between the spring seat and longitudinally extending tube without welding and without fasteners, wherein the longitudinally extending tube includes a first circumferentially extending bead, wherein the spring seat comprises a cylindrical section which overlies a portion of the longitudinally extending tube abutting the first circumferentially extending bead and wherein a second circumferentially extending bead is formed in the longitudinally extending tube after the spring seat is overlayed on the longitudinally extending tube to secure the spring seat on the longitudinally extending tube.

2. A hydraulic damper for a motor vehicle comprising:

a longitudinally extending tube, a piston assembly slidingly fit within the longitudinally extending tube for reciprocation movement therein and a separately formed spring seat positioned on the tube, wherein the longitudinally extending tube is formed of one of aluminum and aluminum alloy be extrusion and includes a first pair of longitudinally extending outwardly directed ribs having a first cross section and a second pair of longitudinally extending ribs having a second cross section different than the first cross section wherein at least the first pair of ribs have shoulders formed by removing material from the first pair of ribs after formation by extrusion;

a spring seat formed of one of aluminum and aluminum alloy and having a spoked shape with an inner cylindrical section engaging the longitudinally extending tube and an outer annular portion supported on the inner cylindrical portion by a number of spokes, the inner cylindrical section having two pair of grooves having sizes and shapes corresponding to the first and second cross sections of the first and second pairs of ribs to correctly locate the spring seat angularly relative to the longitudinally extending tube, wherein the spring seat makes a close sliding fit with the longitudinally extending tube wherein the shoulders engage the spring seat to correctly locate the spring seat longitudinally on the longitudinally extending tube.

* * * * *